3,315,669
SHEARING DEVICE FOR BONE HOLDING PINS
William A. Rhodes, 4421 N. 13th Place,
Phoenix, Ariz. 85014
Filed June 15, 1964, Ser. No. 375,160
8 Claims. (Cl. 128—83)

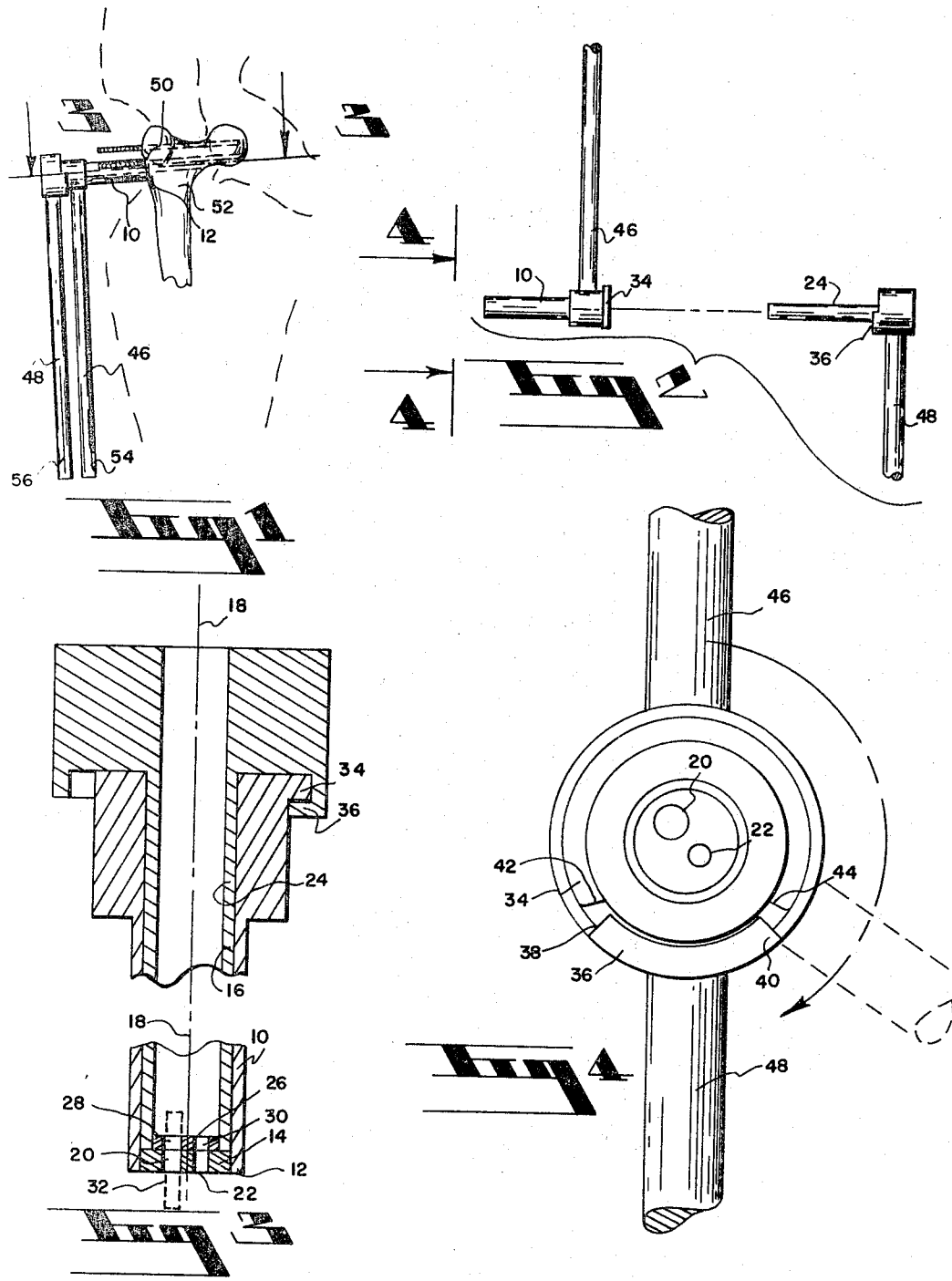

This invention relates to a shearing device for bone holding pins, and, more particularly, to a shearing device for bone holding pins which may be used by orthopedic surgeons for shearing off bone holding pins in close proximity to a bone structure which has been pinned together pending knitting and healing of a broken bone.

In orthopedic surgery it has been a problem to efficiently and neatly shear bone holding pins adjacent to bones which have been pinned. Such operations have been particularly difficult wherein incisions through the flesh are deep, as for example, in areas in which the upper femur of a human leg has been broken and in which a pin has been installed preliminary to knitting and healing of the bone. Conventional shearing devices are difficult to use in deep incisions and in many instances do not provide a neat shearing of the pin, and, further, conventional shearing devices are not conducive to the most desirable operating techniques. Furthermore, conventional shearing devices are not sufficiently powerful to shear large stainless steel pins with reasonable facility. Accordingly, it is an object of the present invention to provide a shearing device for bone holding pins which is very powerful, which may be operated remotely from the area of the bone which is pinned, and which may be readily used in areas where bones are repaired inwardly of deep incisions in the flesh in order to attain the most desirable operating and sanitation techniques.

Another object of the invention is to provide a novel shearing device for bone holding pins wherein a pair of elongated die holders carry very powerful leverage handles, and whereby the elongated die holders support dies at extending ends of the holders capable of being projected into a deep incision to shear bone holding pins adjacent to bones being repaired, all of which permits the shearing dies properly to be placed in close adjacent relationship to the bone and which concurrently permits the operator to apply powerful shearing forces to shear the pin without undue effort and which permits the operator of the shearing device to actuate the handles or levers of the device remotely from the incision in the flesh adjacent the bone and at a considerable distance outwardly thereof.

Another object of the invention is to provide a shearing device for bone holding pins which is capable of very powerful operation with a nominal amount of manual force and which at the same time performs a very neat job of cutting off bone holding pins adjacent to the surface of a bone in which the pin is installed.

Another object of the invention is to provide a shearing device for bone holding pins having a novel pair of relatively rotatable shearing die holders, each provided with a powerful leverage handle, and which are readily severable in order that the elements of the bone shearing device may be autoclaved and thereby efficiently sterilized.

Another object of the invention is to provide a shearing device for bone holding pins having a novel assembly of die holders and lever handles wherein the handles are rotatable about a common axis to actuate dies having pin receiving openings eccentrically disposed about the axis, and wherein axial thrust resisting means coupled to the die holders holds the dies in juxtaposition relative to each other during shearing of a pin in the eccentrically disposed openings.

Further objects and advantages of the invention may be apparent from the following specification, appended claims, and accompanying drawings in which:

FIG. 1 is a side elevational view of a shearing device for bone holding pins in accordance with the present invention and showing the device in position to shear a pin which has been installed in the upper end of a human femur bone, and illustrating by broken lines a deep flesh incision into which the extended die members and die holders of the invention are projected to enable the device of the invention to be operated by powerful lever handles remotely of the incision;

FIG. 2 is a fragmentary exploded view of the die holders and handles of the shearing device of the invention;

FIG. 3 is an enlarged fragmentary sectional view taken from the line 3—3 of FIG. 1 showing by broken lines a pin extending through pin receiving openings in the shearing dies of the invention; and FIG. 4 is an enlarged view taken from the line 4—4 of FIG. 2 showing relative rotation of the handles and the die holders of the invention to dispose partially circular ledge structures on the die holders out of axial interference with each other and to permit axial disassembly of the die holders and handles to facilitate autoclaving and/or sterilization of the parts of the invention.

As shown in FIG. 3 of the drawings, the shearing device for bone holding pins in accordance with the present invention comprises a hollow tubular die holder 10 having an extended end 12 in which a shearing die 14 is fixed and carried by the die holder 10. The hollow tubular die holder 10 is provided with a circular in cross-section bore 16 concentric with a longitudinal axis 18 which is the axis of relative rotation of the dies of the invention, as will be hereinafter described.

The die 14 is provided with a pair of openings 20 and 22 extending therethrough. These openings 20 and 22 vary in diameter for receiving any shearing various diameter pins. Both of these openings 20 and 22 are eccentric and disposed radially outward from the axis 18, which is the longitudinal or rotational axis of the die 14.

A second die holder 24 is rotatably mounted in the bore 16 of the die holder 10 and this die holder 24 may be hollow tubular as shown, and is preferably so, to permit sheared portions of pins to readily be removed from the device, as will be hereinafter described.

Carried by the elongated die holder 24 is a second shearing die 26. This die 26 is contiguous with the die 14 and is provided with a pair of pin receiving openings 28 and 30 adapted to register and align with the openings 20 and 22, respectively, so that a pin 32, as indicated by broken lines in FIG. 3, may be extended through the openings 20 and 28 and sheared by relative rotation of the dies 14 and 26 about the longitudinal axis 18 when the handles connected to the die holders 10 and 24 are rotated relative to each other, as will be hereinafter described.

The die holder 10 is provided with an annular ledge structure 34 which is only partially circular, as shown in FIG. 4 of the drawings, which is adapted to be engaged by an overlapping ledge portion 36 of the die holder 24 to resist axial movement of the die holder 24 relative to the die holder 10 when a pin 32 is being sheared in the openings 20 and 28, or in the openings 22 and 30, as desired. As shown in FIG. 4 of the drawings, the partially circular ledge structures 34 and 36 may be rotated into position so that opposite ends 38 and 40 of the arcuate ledge 36 clears opposite ends 42 and 44 of the arcuate ledge 34. Thus the die holder 24 may be removed from the die holder 10, as shown in FIG. 2 of the drawings.

Fixed to the die holder 10 is an elongated handle 46 and fixed to the die holder 24 is an elongated handle 48.

These handles 46 and 48 are operable manually to rotate the dies 14 and 26 relative to each other to cause the eccentric openings in the dies to shear pins about the longitudinal or rotational axis 18, hereinbefore described.

As shown in FIG. 1 of the drawings, the extended end 12 of the die holder 10 is disposed in close proximity to a surface 50 of a femur bone 52 wherein bone holding pins 32 have been installed. Openings 20 and 28 are positioned over and receive one of the pins 32, as indicated by broken lines in FIG. 3 of the drawings, whereupon ends 54 and 56 of the handles 46 and 48 may be manually engaged by hands of the operator to forcefully cause rotation of the die holders 10 and 24 relative to each other and to shear the respective pin 32.

Due to the flat planes of the dies normal to the axis 18, the pin is sheared very neatly, and this is also accomplished in accordance with the ledges 34 and 36 which resist axial thrust and displacement of the dies relative to each other and longitudinally of the axis 18. Thus the end of a pin may be sheared square and neat and the powerful leverage of the handles 46 and 48 may be utilized to do this shearing job with ease and facility. Furthermore, the remote position of the extending ends of the die holder 10 permits the operator to reach into a deep incision adjacent to the bone and to maintain a forceful operation of the handles 46 and 48 remotely of the area of the bone, thereby greatly improving operational and sanitary techniques.

The shearing device of the invention having a very short distance from the centers of the pin shearing openings 20 and 28 and 22 and 30 from the axis 18, this distance being very short relative to the length of the handles 46 and 48 provides a very powerful leverage factor which permits the shearing of very hard and tough stainless steel or other similar pins with a minimum amount of effort being applied to the handles 46 and 48, thus causing a minimum disturbance of the respective pin which is installed in the bone, as shown in FIG. 1 of the drawings.

When the pin shearing operation has been completed the extending portion of the pin which is sheared off is retained internally of the hollow tubular die holder 24, and may readily be removed therefrom after the device is removed from the incision, as indicated in FIG. 1 of the drawings.

For the purpose of sterilization, the shearing device of the invention may be disassembled, as hereinbefore described in connection with FIGS. 2 and 4 of the drawings, and the individual parts may then be placed in an autoclave and efficiently sterilized so that the device may be readied for the next succeeding operation.

It will be obvious to those skilled in the art that various modifications of the present invention may be resorted to in a manner limited only by a just interpretation of the following claims.

I claim:

1. In a shearing device for bone holding pins the combination of: a first elongated hollow tubular shearing die holder having an extended end; a second elongated die holder rotatably mounted about a longitudinal axis and in said first hollow tubular die holder; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therein; and first and second handles connected to said first and second die holders to effect manual rotation of said first and second die means relative to each other about said longitudinal axis to effect shearing of a pin in said openings in said dies.

2. In a shearing device for bone holding pins the combination of: a first elongated hollow tubular shearing die holder having an extended end; a second elongated die holder rotatably mounted about a longitudinal axis and in said first hollow tubular die holder; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therein; and first and second handles connected to said first and second die holders to effect manual rotation of said first and second die means relative to each other about said longitudinal axis to effect shearing of a pin in said openings in said dies; axial thrust resisting means rotatably engaged and connected with said first and second die holders to hold said first and second die holders and said dies in juxtaposition with each other longitudinally of said longitudinal axis during shearing of a pin in said openings of said first and second dies.

3. In a shearing device for bone holding pins the combination of: a first elongated hollow tubular shearing die holder having an extended end; a second elongated die holder rotatably mounted about a longitudinal axis and in said first hollow tubular die holder; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therein; and first and second handles connected to said first and second die holders to effect manual rotation of said first and second die means relative to each other about said longitudinal axis to effect shearing of a pin in said openings in said dies; axial thrust resisting means rotatably engaged and connected with said first and second die holders to hold said first and second die holders and said dies in juxtaposition with each other longitudinally of said longitudinal axis during shearing of a pin in said openings of said first and second dies; said axial thrust resisting means comprising a pair of radially overlapping arcuate ledges, one of said ledges connected to said first die holder and another of said ledges connected to the other of said die holders.

4. In a shearing device for bone holding pins the combination of: a first elongated hollow tubular shearing die holder having an extended end; a second elongated die holder rotatably mounted about a longitudinal axis and in said first hollow tubular die holder; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therein; and first and second handles connected to said first and second die holders to effect manual rotation of said first and second die means relative to each other about said longitudinal axis to effect shearing of a pin in said openings in said dies; axial thrust resisting means rotatably engaged and connected with said first and second die holders to hold said first and second die holders and said dies in juxtaposition with each other longitudinally of said longitudinal axis during shearing of a pin in said openings of said first and second dies; said axial thrust resisting means comprising a pair of radially overlapping arcuate ledges, one of said ledges connected to said first die holder and another of said ledges connected to the other of said die holders; said arcuate ledges being only partially circular whereby they may be rotated about said longitudinal axis and thereby disposed out of axial interference with each other to permit removal of said second die holder from said first die holder longitudinally of said longitudinal axis.

5. In a shearing device for bone holding pins the combination of: a first elongated hollow tubular shearing die holder having an extended end; a second elongated die holder rotatably mounted about a longitudinal axis and in said first hollow tubular die holder; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therein; and first and second handles connected to said first and second die holders to effect manual rotation of said first and second die means relative to each other about said longitudinal axis to effect shearing of a pin in said openings in said dies; said die holders extending a substantial distance from said handles to said extending end of said first die holder whereby said dies may reach into a deep incision in flesh and into close proximity to a bone for shearing a pin adjacent thereto, and whereby said handles may be actuated remotely relative to said flesh to thereby faciltate operation and sanitation techniques.

6. In a shearing device for bone holding pins the combination of: a first elongated die holder having an extending end; a second elongated die holder rotatably mounted on said first die holder about a longitudinal axis; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therethrough; and first and second handle means connected respectively to said first and second die holders to effect manual rotation of said first and second die means relative to each other about said longitudinal axis to effect shearing of a pin in said openings in said dies.

7. In a shearing device for bone holding pins the combination of: a first elongated die holder having an extending end; a second elongated die holder rotatably mounted on said first die holder about a longitudinal axis; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therethrough; and first and second handle means connected respectively to said first and second die holders to effect manual rotation of said first and second die means relative to each other about said longitudinal axis to effect shearing of a pin in said openings in said dies; axial thrust resisting means rotatably engaged and connected with said first and second die holders to hold said first and second die holders and said dies in juxtaposition with each other longitudinally of said longitudinal axis during shearing of a pin in said openings of said first and second dies.

8. In a shearing device for bone holdings pins the combination of: a first elongated die holder having an extending end; a second elongated die holder rotatably mounted on said first die holder about a longitudinal axis; a shearing die means carried by said extending end of said first die holder; a second shearing die means adjacent said first shearing die means and carried by said second die holder; said first and second shearing die means having pin receiving openings disposed eccentrically and radially outward from said longitudinal axis, said openings of both die means disposed to register and align with each other to receive a pin therethrough; and first and second handle means connected respectively to said first and second die holders to effect manual rotation of said first and second die means relative to each other about said longitudinal axis to effect shearing of a pin in said openings in said dies; said die holders extending a substantial distance from said handles to said extending end of said first die holder whereby said dies may reach into a deep incision in flesh and into close proximity to a bone for shearing a pin adjacent thereto and whereby said handles may be actuated remotely relative to said flesh and to thereby facilitate operation and sanitation techniques.

References Cited by the Examiner

UNITED STATES PATENTS

| 2,560,318 | 7/1951 | Wenger | 30—240 |
| 2,693,798 | 11/1954 | Habousk | 128—83 |
| 2,963,785 | 12/1960 | Dilling | 83—196 |

RICHARD A. GAUDET, *Primary Examiner.*

J. W. HINEY, *Assistant Examiner.*